US010268456B2

(12) United States Patent
Kalyanasundaram et al.

(10) Patent No.: US 10,268,456 B2
(45) Date of Patent: Apr. 23, 2019

(54) STANDARDIZED APPROACH TO CONTEXTUAL CODE IDENTIFICATION IN EDITORS AND IDES

(71) Applicant: Oracle International Corporation, Redwood Shores, CA (US)

(72) Inventors: Anand Kumar Kalyanasundaram, Bangalore (IN); Srinivasan T. Raman, Bangalore (IN); Rodney Kent Magnuson, Jr., Santa Clara, CA (US); Mark John Romano, Bedford, NH (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/863,587

(22) Filed: Sep. 24, 2015

(65) Prior Publication Data

US 2016/0092414 A1 Mar. 31, 2016

Related U.S. Application Data

(60) Provisional application No. 62/056,081, filed on Sep. 26, 2014.

(51) Int. Cl.
*G06F 8/33* (2018.01)
(52) U.S. Cl.
CPC .................................. *G06F 8/33* (2013.01)
(58) Field of Classification Search
CPC . G06F 17/2785; G06F 17/2247; G06F 17/227
USPC ....................................................... 715/234
See application file for complete search history.

(56) References Cited

U.S. PATENT DOCUMENTS

2008/0133473 A1* 6/2008 Broder .............. G06F 17/30675

OTHER PUBLICATIONS

Microsoft, "TreeNodeMouseHoverEventArgs Class," at least Nov. 22, 2013, availabe at: https://web.archive.org/web/20131122113918/http://msdn.microsoft.com/en-us/library/system.windows.forms.treenodemousehovereventargs(v=vs.110).aspx*
"Firebug 1.5: Editing, Debugging, and Monitoring Web Pages, Arm yourself to destroy UI and JavaScript bugs," 2010 (Year: 2010).*
Sharma, "XPath, FireBug & FirePath," Apr. 6, 2014 (Year: 2014).*
Sorens, "XPath, CSS, DOM and Selenium: TheRosetta Stone," 2011 (Year: 2011).*

* cited by examiner

*Primary Examiner* — Shawn S Joseph
(74) *Attorney, Agent, or Firm* — Kilpatrick Townsend & Stockton LLP

(57) ABSTRACT

In various aspects, systems and methods provide a standardized approach to contextual code identification in editors and integrated development environments (IDEs). Thus, a given cursor position inside a language file like cascading style sheets (CSS), JavaScript, or java can be represented by storing language type and hierarchy information at the current position in a mime type or mime type-like syntax. Different editor assist handler modules can then be chained to process the syntax to provide a particular feature or insight. Features or products can evolve incrementally by adding a new handler module that processes the same syntax. In one aspect, the actual handler modules used can be determined depend on the cursor context.

18 Claims, 9 Drawing Sheets

```
import 'dart:html';
import 'dart:async';

@CustomTag('whatever')
class NewStopwatch extends Element {
  @observable String counter='00:00';

Stopwatch mywatch = new Stopwatch();

ButtonElement resetButton;

@override
  void attached() {
    ...
  }
}
```

Cursor is here

500

Cursor context (using mime type like syntax):

text/java/dart/class[NewStopWatch extends Element]/function[attached()] /

510

Cursor context (using mime type syntax):

text/x-java-source;filecontent= dart;pathcontent=class[NewStopWatch extends Element]/function[attached()] /

STANDARDIZED APPROACH TO CONTEXTUAL CODE IDENTIFICATION IN EDITORS AND IDES

CROSS-REFERENCE TO RELATED APPLICATIONS

This application claims the benefit of and priority to U.S. Provisional Patent Application No. 62/056,081, filed Sep. 26, 2014 and entitled "STANDARDIZED APPROACH TO CONTEXTUAL CODE IDENTIFICATION IN EDITORS AND IDES," the entire disclosure of which is hereby incorporated by reference for all purposes.

BACKGROUND OF THE INVENTION

1. Field of the Invention

This invention relates generally to computer user interfaces, and more particularly to a standardized approach to contextual code identification in editors and integrated Development environments (IDEs).

2. Description of the Related Art

An application refers to a software program, which on execution performs specific desired tasks. In general, several applications are executed in a run-time environment containing one or more of operating systems, virtual machines (e.g., supporting Java™ programming language), device drivers, etc., as is well known in the relevant arts.

Developers often use Application Development Frameworks (ADFs) (which are by themselves applications) for implementing/developing desired applications. An ADF provides a set of pre-defined code/data modules that can be directly/indirectly used in the development of an application. An ADF may also provide tools such as an IDE (integrated development environment), code generators, debuggers, etc. which facilitates a developer in coding/implementing the desired logic of the application in a faster/simpler manner.

In general, an ADF simplifies development of applications by providing re-usable components and integrated development environments, which application developers can use to define user interfaces and application logic by, for example, selecting components to perform desired tasks and defining the appearance, behavior, and interactions of the selected components. Some ADFs are based on a model-view-controller design pattern that promotes loose coupling and easier application development and maintenance. Oracle Application Development Framework is one example of an ADF that utilizes this design pattern.

Oracle ADF includes libraries of standards-based Java Server Faces (JSF) components with built-in HTML5 and Ajax functionality. With these components, web deployed user interfaces can be developed with a level of functionality and interactivity previously reserved for thick-client applications. The components offer data interaction, data visualization, and encapsulated browser side operations in a set of easy to use components that makes rich client application development easier than ever. Oracle ADF further provides a data-binding framework that simplifies binding UI to business services through a simple drag and drop operations in the IDE. This is done while still keeping the independence of the business service from consuming interfaces. With the framework, the UI developer is insulated from the underlying implementation of the business service layer. This makes the process of building the UI truly decoupled from the implementation of the business service layer, better positioning the application for implementation in a service-oriented architecture.

Accordingly, what is desired is to solve problems relating to building application using development environments, some of which may be discussed herein. Additionally, what is desired is to reduce drawbacks relating to building application using development environments, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In embodiments, using a position of a cursor in a document, a context can be determined within at least the document of data at the position of the cursor. A context reference for a current position of the cursor can be generated using the determined context. The context reference can be expressed using at least a type and subtype of the document and a hierarchy associated with the context. The context reference can be used by one or more editor assist tools to provide information to a user editing the document. In further embodiments, expressing the cursor context and language in a single mime type/mime type-like text syntax allows the editor assist tools to easily get and understand the current cursor context.

In one embodiment, determining the context within at least the document of the data at the position of the cursor includes determining a path in the hierarchy. Determining the context within at least the document of the data at the position of the cursor may include determining a set of parameters representing the hierarchy. In one embodiment, determining the context within at least the document of the data at the position of the cursor determining a rule of a style sheet that includes a selector at the current position of the cursor. Determining the context within at least the document of data at the position of the cursor can include determining a function or method that encloses a block of code at the current position of the cursor.

In one embodiment, generating the context reference for the current position of the cursor based on the determined context can include generating a string having the type and the subtype of the document and the hierarchy associated with the context expressed as token-separated elements. Generating the context reference for the current position of the cursor based on the determined context can include generating a string having the type and the subtype of the document and the hierarchy associated with the context expressed as attribute-value pairs.

In one embodiment, the context reference can be send to an insight provider. The insight provider can provide insight various forms in response to the insight provider parsing the context reference. One or more actions can then be performed within the document based on the insight received from the insight provider.

In one embodiment, a non-transitory computer-readable medium is provided storing a computer program product which when executed by one or more processors associated with one or more computer system cause the one or more processors to carry out a method comprising receiving position of a cursor in a document, determining a context within at least the document of data at the position of the cursor, and generating a context reference for a current position of the cursor based on the determined context, the context reference expressing at least a type and subtype of the document and a hierarchy associated with the context.

In one embodiment, a system is provided that includes a hardware processor and a memory storing a set of instruction which when executed by the processor cause the processor to receive position of a cursor in a document, determine a context within at least the document of data at the position of the cursor, and generate a context reference for a current position of the cursor based on the determined context, the context reference expressing at least a type and subtype of the document and a hierarchy associated with the context.

In a further embodiment, a context reference associated with data at a position of a cursor within a document can be received. The context reference can be parsed to determine a type and subtype of the document. The context reference can be accepted or rejected based on the determined type or subtype. A hierarchy associated with a context can be determined within at least the document of the data at the position of the cursor in response to parsing the context reference. The context reference can be accepted or rejected based on the determined hierarchy. The context reference can be forwarded to an insight provider. Information can be generated based on analyzing one or more elements in the determined hierarchy. One or more actions can then be performed based on analyzing one or more elements in the determined hierarchy.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

FIG. 5 is an example of a context reference according to one embodiment using Dart.

DETAILED DESCRIPTION OF THE INVENTION

Figure 1:
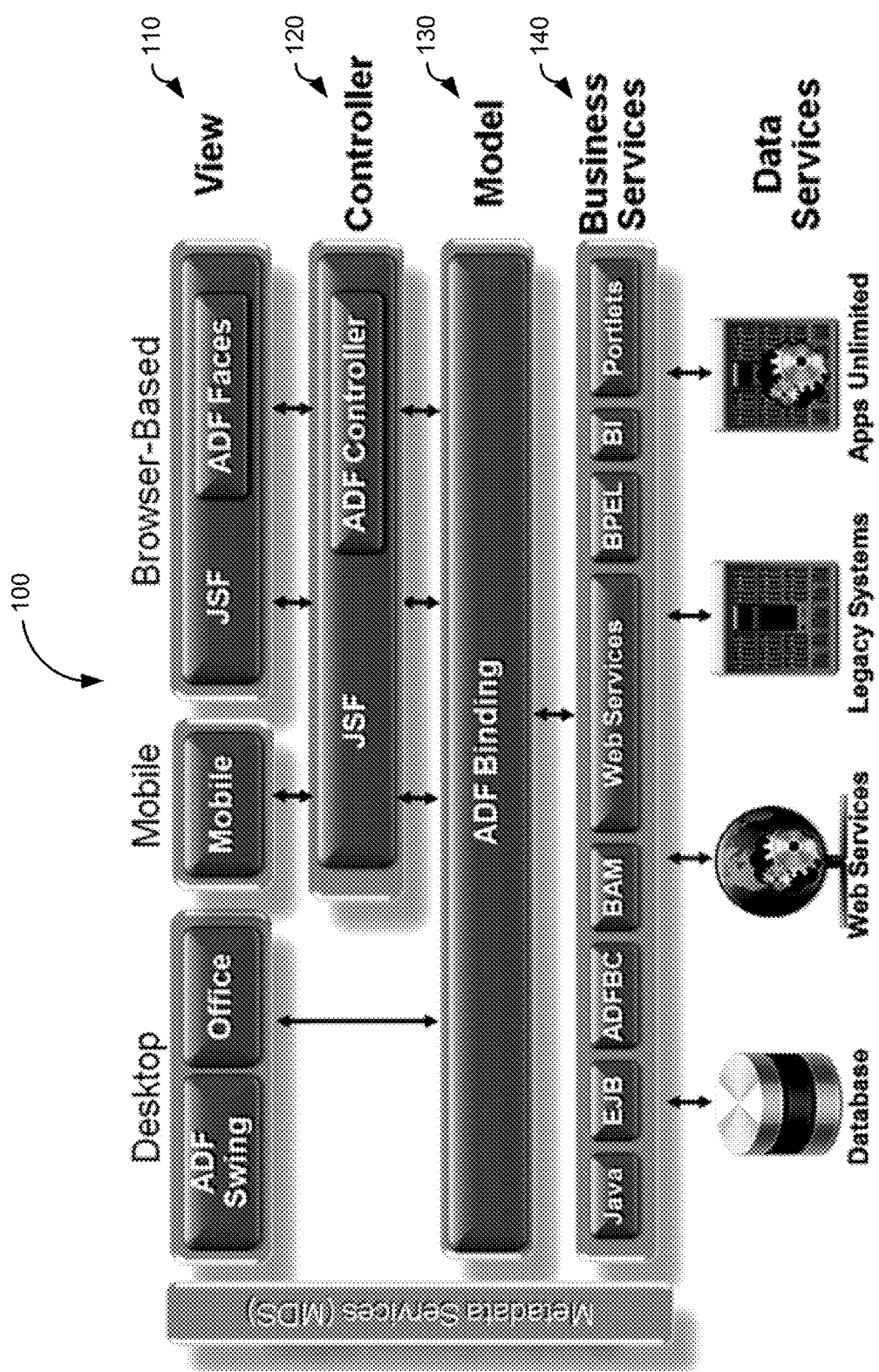
FIG. 1 is a block diagram illustrating an application development framework (ADF) in one embodiment according to the present invention.

In the following description, for the purposes of explanation, specific details are set forth in order to provide a thorough understanding of embodiments of the invention. However, it will be apparent that various embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments. The figures and description are not intended to be restrictive. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" or "computer-readable medium" includes, but is not limited to, portable or non-portable storage devices, optical storage devices, wireless channels, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable or computer-readable medium. One or more processors may perform the necessary tasks.

Systems depicted in some of the figures may be provided in various configurations. In some embodiments, the systems may be configured as a distributed system where one or more components of the system are distributed across one or more networks in a cloud computing system. In further embodiments, the systems may be configured as a single system where one or more components of the system incorporated into a single structure or package.

Introduction

Java EE is a standard, robust, scalable, and secure platform that forms the basis for many of today's enterprise applications. Java EE provides a set of specifications for building multi-tier applications using the Java language. In the past, there was a direct correlation between the robust nature of an application to the complexity required to achieve it. However, with the advent of ADFs, such as Oracle ADF, the implementation of extremely rich Java EE applications can be provided by adhering to standard patterns and practices with greatly reduced effort.

With the increased need for organizations to build composite applications that utilize Service Oriented Architecture (SOA) principles, developers are forced to create applications that are extremely agile. Implementing these best practices in agile applications usually involves writing a significant amount of infrastructure code, adding another obstacle for developers building their first Java EE application. In addition to providing robust, performant, and maintainable applications—Oracle ADF provides the infrastructure code to implement agile SOA based applications thereby removing the effort involved in an organization "rolling their own."

Oracle ADF further provides a visual and declarative approach to Java EE development through the Oracle JDeveloper 11g development tool. Oracle ADF implements the Model-View-Controller design pattern and offers an integrated solution that covers all the layers of this architecture with solution to such areas as Object/Relational mapping, data persistence, reusable controller layer, rich Web user interface framework, data binding to UI, security and customization. Extending beyond the core Web based MVC approach, ADF also integrates with the Oracle SOA and WebCenter Portal frameworks simplifying the creation of complete composite applications.

For example, Oracle ADF makes it easy to develop agile applications that expose data as services by coupling a service interface to the built-in business services in ADF. This separation of business service implementation details is performed in Oracle ADF via metadata. Use of this metadata-driven architecture enables application developers to focus on the business logic and user experience, rather than the details of how services are accessed.

Oracle ADF stores the implementation details of these services in metadata in the ADF Model layer. This enables developers to exchange services without modifying the user interface, making the application extremely agile. Additionally, the developer creating the user interface does not need to bother with business service access details. Instead, developers can focus on developing the application interface and interaction logic. Creating the user experience can be as simple as dragging-and-dropping the desired business services onto a visual page designer and indicating what type of component should represent that data.

FIG. 1 is a block diagram illustrating application development framework (ADF) 100 in one embodiment according to the present invention. FIG. 1 is a simplified illustration of a system that may incorporate various embodiments or implementations of the one or more inventions presented within this disclosure. FIG. 1 may merely be illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

ADFS 124 may be embodied as Oracle ADF is one example. Accordingly, ADFS 124 is based on a Model-View-Controller (MVC) design pattern. An MVC application is separated into: 1) a model layer that handles interaction with data-sources and runs the business logic, 12) a view layer that handles the application user interface, and 3) a controller that manages the application flow and acts as the interface between the Model and the View layers. Separating applications into these three layers simplifies maintenance and reuse of components across applications. The independence of each layer from the others results in a loosely coupled, Service Oriented Architecture (SOA).

In this embodiment, modules forming an enterprise application are shown as being within ADFS 124 to represent that the modules are developed using ADF and then executed within the context of ADFS 124. For conciseness, the various internal details of ADF are not shown assuming that the application is developed using the JAVA programming language and Oracle ADF available as part of JDeveloper 10.1.3, a development tool available from Oracle Corporation. However, the features of the present invention described below may be implemented using any desired combination of programming language and application development framework as will be apparent to one skilled in the relevant arts by reading the disclosure provided herein.

In various embodiments, ADFS 124 an application to be developed in the form of multiple layers, each layer containing code modules/files implementing desired logic according to pre-defined specification. Thus, in one embodiment, ADFS 124 enables the application to be developed as four layers: view layer 110 containing code modules/files that provide the user interface of the application, controller layer 120 containing code modules that control the flow of the application, model layer 130 containing data/code modules that provide an abstraction layer for the underlying data, and business services layer 140 containing code modules that provide access to data from various sources and handles business logic.

Oracle ADF lets developers choose the technology they prefer to use when implementing each of the layers. FIG. 1 shows various options available for developers when building Oracle ADF applications. The glue that integrates the various components of Java EE applications and makes development so flexible is the Oracle ADF model layer. EJB, Web Services, JavaBeans, JPA/EclipseLink/TopLink objects, and many others can all be used as Business Services for the Oracle ADF Model. View layers can include Web based interfaces implemented with JSF, Desktop Swing applications and MS Office front ends, as well as interfaces for mobile devices.

It may be appreciated that the development of the application using such a layered approach often simplifies maintenance and reuse of components/code modules across various applications. Further, the independence of each layer from the other layers results in a loosely coupled service oriented architecture (SOA), which may be desirable when deploying the developed business/enterprise application on multiple/different systems.

In one aspect, view layer 110 represents the user interface of the application being developed. View layer 110 is shown with desktop, mobile, and browser-based views, each of which provides all or a portion of the user interface and is accessible in a variety of manners corresponding to view type. For example, web pages may be sent by the application in response to receiving client requests containing corresponding URLs. The web pages may then be displayed by a browser on a display unit (not shown) associated with a requesting client system, thereby enabling users of the requesting client system to interact with the enterprise application. Oracle ADF support multi-channel access to business services allowing reuse of business services and access from a Web client, a client-server swing desktop-based application, Microsoft Excel spreadsheets, mobile devices such as a smart-phone, or the like.

The code files/modules forming the view layer (such as web pages) may be implemented using one or more of hypertext markup language (HTML), Java server pages (JSP), and Java Server Faces (JSF). Alternatively, the user interface may be implemented using Java components such as Swing, and/or extensible markup language (XML). As further noted, the user interface may leverage a user's experience and familiarity with desktop applications, such as Word and Excel by Microsoft.

As noted above, the relevant user-developed code/data modules are provided in each of the layers. However, each layer typically contains other pre-defined code/data modules provided by ADFS 124. Some of the pre-defined modules may be used during development, for example, as templates for developing the web pages, for including desired functionality in the developed code etc. Other pre-defined modules (such as a URL rewriting module) may be deployed along with the developed application and may provide additional functionalities (mapping of requested URLs to internal names) to the user during execution of the enterprise application.

Controller layer 120 contains code modules/files that control the flow of the application. Each controller object contains software instructions and/or data implemented according to a desired manner of presenting information in view layer 110. The desired manner may include the specific web pages to be displayed when links in another web page are clicked/selected by the user, the page to be displayed when errors occur during execution, indicating the specific data to be stored/retrieved, etc.

In one aspect, controller layer 120 manages the applications flow and handles user input. For example, when a Search button is clicked on a page, the controller determines what action to perform (do a search) and where to navigate to (the results page). There are two controller options for web-based applications in JDeveloper: the standard JSF controller or the ADF Controller that extends the JSF controller functionality. Whichever controller is used, application flow is typically designed by laying out pages and navigation rules on a diagram. An application's flow can be broken into smaller, reusable task flows; include non-visual components such as method calls and decision points in a flow; and create "page fragment" flows that run inside a region of a single containing page.

The code modules/files forming controller layer 120 are often implemented as Java servlets receiving the client requests and sending desired web pages as corresponding responses. Controller objects may also be implemented, for example, as Apache Jakarta Struts controllers or according to the JSF standard.

Model layer 130 contains data/code modules that connect various business services to the objects that use them in the other layers, such as to the controller objects discussed above or directly to desktop applications as shown. Each abstract data objects of model layer 130 provides a corresponding interface that can be used to access any type of business service, executing in underlying business service layer 140. The data objects may abstract the business service implementation details of a service from a client and/or expose data control methods/attributes to view components, providing a separation of the view and data layers.

In one aspect, model layer 130 consists of two components, data controls and data bindings, which utilize metadata files to define the interface. Data controls abstract the business service implementation details from clients. Data bindings expose data control methods and attributes to UI components, providing a clean separation of the view and model. Due to the metadata architecture of the model layer, developers get the same development experience when binding any type of Business Service layer implementation to the View and Controller layers.

Oracle ADF emphasizes the use of the declarative programming paradigm throughout the development process to allow users to focus on the logic of application creation without having to get into implementation details. At a high level, the development process for a Fusion web application usually involves creating an application workspace. Using a wizard, libraries and configuration needed for technologies selected by a developer are automatically added and an application is structured into projects with packages and directories.

By modeling database objects, an online database or offline replica of any database can be created, definitions edited, and schemas updated. Using an UML modeler, use cases can then be created for the application. Application control and navigation can also be designed. Diagrammers can be used to visually determine the flow of application control and navigation. Then, an underlying XML file describing the flow can be automatically created. A resource library can be used to allow a developer to view and use imported libraries by simply dragging and dropping them into the application. From database tables, entity objects can be created using wizards or dialogs. From those entity objects, view objects are created to be used by pages in the application. Validation rules and other types of business logic can be implemented.

In this example, business services layer 140 manages interaction with a data persistence layer. It provides such services as data persistence, object/relational mapping, transaction management, and business logic execution. The Business Services layer in Oracle ADF can be implemented in any of the following options: As simple Java classes, EJB, Web services, JPA objects, and Oracle ADF Business Components. In addition, data can be consumed directly from files (XML or CSV) as well as REST.

Thus, each business service manages interaction with a corresponding data persistence layer, and also provides such services as object/relational mapping, transaction management, business logic execution, etc. The business services layer may be implemented using one or more of simple Java classes, Enterprise Java Beans, web services, etc.

Business components represent a business service implemented using, for example, Oracle ADF Business Components, to provide interaction with databases, web services, legacy systems, application servers, and the like. In one embodiment, business components of business services layer 140 contain a mixture of application modules, view/query objects, and entity objects, which cooperate to provide the business service implementation. An application module can be a transactional component/code module that UI clients communicate with for working with application/transaction data. The application module may provide an updatable data model and also procedures/functions (commonly referred to as service methods) related to user transactions.

An entity object may represent a corresponding row in a database table and simplifies the manipulation (update, deletion, etc.) of the data stored in the corresponding row. An entity object often encapsulates business logic for the corresponding row to ensure that the desired business rules are consistently enforced. An entity object may also be associated with other entity objects to reflect relationships existing between rows stored in the underlying database.

Integrated Development Environment

In various aspects, systems and methods provide a standardized approach to contextual code identification in editors and integrated development environments (IDEs). Thus, a given cursor position inside a language file like cascading style sheets (CSS), JavaScript, or java can be represented by storing language type and hierarchy information at the current position in a mime type or mime type-like syntax. Different editor assist handler modules can then be chained to process the syntax to provide a particular feature or insight. Features or products can evolve incrementally by adding a new handler module that processes the same syntax. In one aspect, the actual handler modules used can be determined depend on the cursor context.

Figure 2:
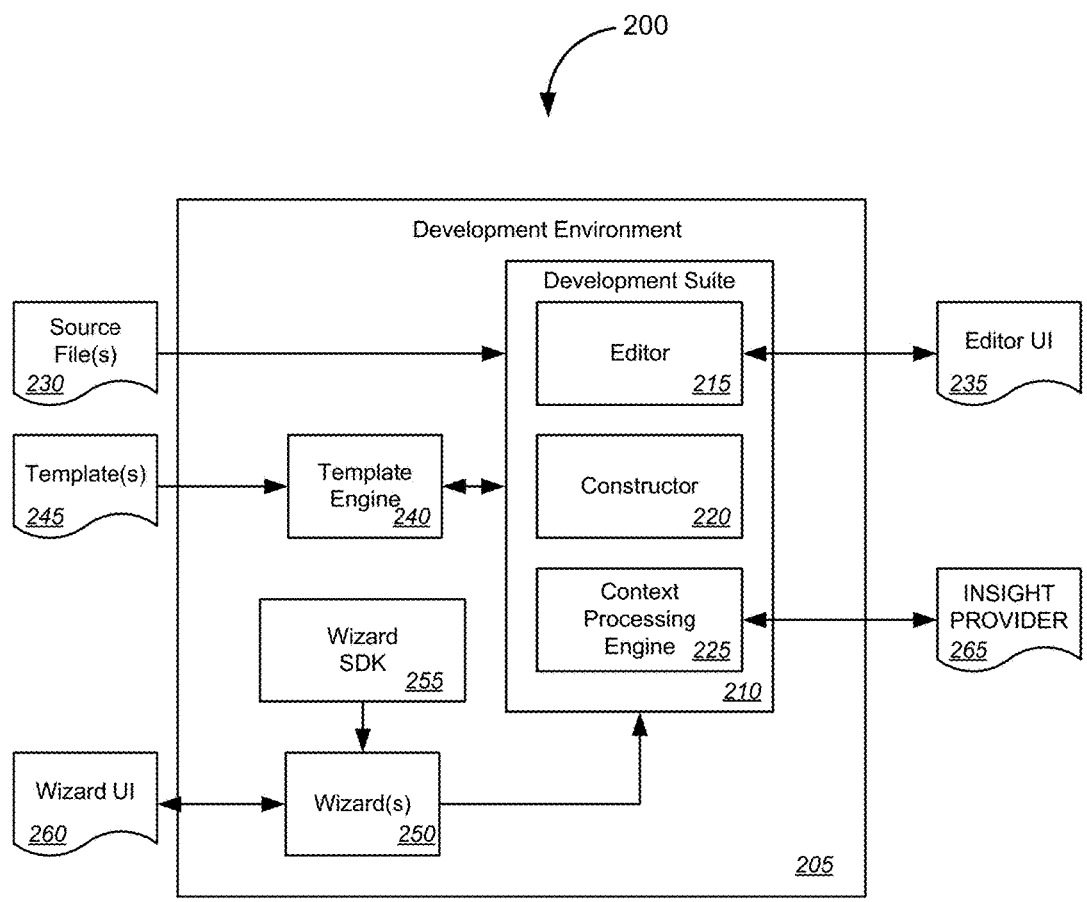
FIG. 2 is a block diagram illustrating, at a high-level, functional components of a system for providing contextual code identification according to one embodiment of the present invention.

FIG. 2 is a block diagram illustrating, at a high-level, functional components of system 200 for providing contextual code identification according to one embodiment of the present invention. FIG. 2 may merely be illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

In this example, system 200 includes development environment 205 hardware and/or software elements that provide comprehensive facilities to developers for the development web-based applications, standalone applications, application server components, user interfaces, workflows, system logic, or the like. Development environment 205 may be embodied as executing on one or more computer systems such cloud infrastructure system 102 described above. In certain embodiments, development environment 205 can include JDeveloper or another such environment.

In this example, development environment 205 includes development suite 210 with editor 215, constructor 220, and context processing engine 225. Editor 215 is capable of editing one or more of a variety of source files (e.g., source files 230) in one or more of a variety of formats and/or for a variety of supported languages. Editor 215 may integrate with one or more build automation tools, debuggers, compilers, interpreters, object viewers, simulators, test environments, version control systems, installation builders, or the like for use by developers to create and deploy applications, user interfaces, SOA processes, workflows, or the like together.

Source files 230 can be viewed and edited through editor user interface (UI) 235 presented by development suite 210. Additionally, new project having a collection of source files 230 can be created using editor 215, for example, through editor UI 235. Project code or other definitions can be edited or extended using editor UI 230. Editor 215 (in conjunction with editor UI 235) can include features that offer intelligent code completion, intelligent hinting, intelligent code navigation, or the like.

In certain embodiments, development suite 210 can also include constructor 220. Constructor 220 can comprise one or more wizards or flows that can be used by a developer to construct such applications, user interfaces, SOA processes, workflows, or the like. Development environment 205 can include template engine 240 that helps developers create applications, user interfaces, SOA processes, workflows, or the like according to prescribed patterns, e.g., naming conventions, layouts, application structures, etc. defined in a set of one or more templates 245. Template engine 240 can use the definitions from templates 240 to write out source files 230 that can be opened in development suite 210.

Generally speaking, templates 245 can include bootstrap code, user interfaces, or the like for accelerating the development of applications, user interfaces, SOA processes, workflows, or the like. When a new project is created using one or more of templates 235, or when new source files are added to an existing project using one or more of templates 235, template code or other definitions can be copied and the user can further edit or extend these newly created projects and/or files, for example, through editor UI 235. Note that in certain embodiments changes to templates 245 need not be propagated to projects consuming those templates. Rather, the templates merely aid productivity instead of rendering common behavior or a form of inheritance.

In one aspect, a given one of templates 245 can be an entire application composite, an application component, or a fragment of code. These different template types can be created at any point during the project. Each of templates 245 can include definitions of the process, task, component, etc. with variables identified for some attributes. Values for these variables can be set based on information collected from the developer at runtime when a template is used in the development environment 205. Each of templates 245 can also include a manifest explaining what the template is and what it might be used for. A template defining a component can also define dependencies for that component and package those as part of the template. A template defining a process can also define dependencies and what components are within the scope and not within the scope of that process. Once template is packaged and developer wants to use it (e.g., a graphical representation of that template is dragged from a palette onto a canvas for the project in editor UI 235) a check can be performed on dependencies defined in that template to assure no collisions etc. based on use of the template in that process.

In certain embodiments, a mechanism is provided to interject additional code into the template creation process and associate wizards 250 to the template. For example, a developer can uses wizard SDK 255 of the development environment 205 to create and attach one or more of wizards 250 to one or more of templates 245. A wizard can include defined wizard user interface (e.g., wizard UI 260) with a definition of variables within the associated template 235 to be set for a particular use case, i.e., based on the use of the template within a given definition. It should be noted that while illustrated here for the sake of clarity as being separate from editor UI 235, wizard UI 260 may in practice be presented in the same interface, e.g., as a pop up or other element in editor UI 235.

Subsequently, when a template is used at runtime of constructor 220, the associated wizard can then be used to guide the developer through defining values for variables identified in the template according to rules for particular use cases being defined (formats, naming conventions, etc.) also defined in the template. For example, constructor 220 detects whether there is a template selected. If so, constructor 220 detects whether there is a wizard attached. If so, constructor 220 can read the set of variables of the template and fill the values for those variables via a set of questions presented to the user/developer by the associated wizard.

In various embodiments, context processing engine 225 determines a cursor context inside of a current language in editor 210. Context processing engine 225 can represent the current cursor context using a mime type-like syntax. Context processing engine 225 can provide a request having the current cursor context expressed in the mime type-like syntax to insight provider 265. Insight provider 265 can include one or more components of development suite 205, one or more components of development environment 205, or one or more external components, applications, or services. Insight provider 265 can use the cursor context for insight determination. Insight determination as used herein is the process of determining relevant information associated with a context. An insight determination may include a determination for syntax highlighting or refactoring, code hinting, code navigation, code expansion, or the like.

Contextual Code Identification

Figure 3:
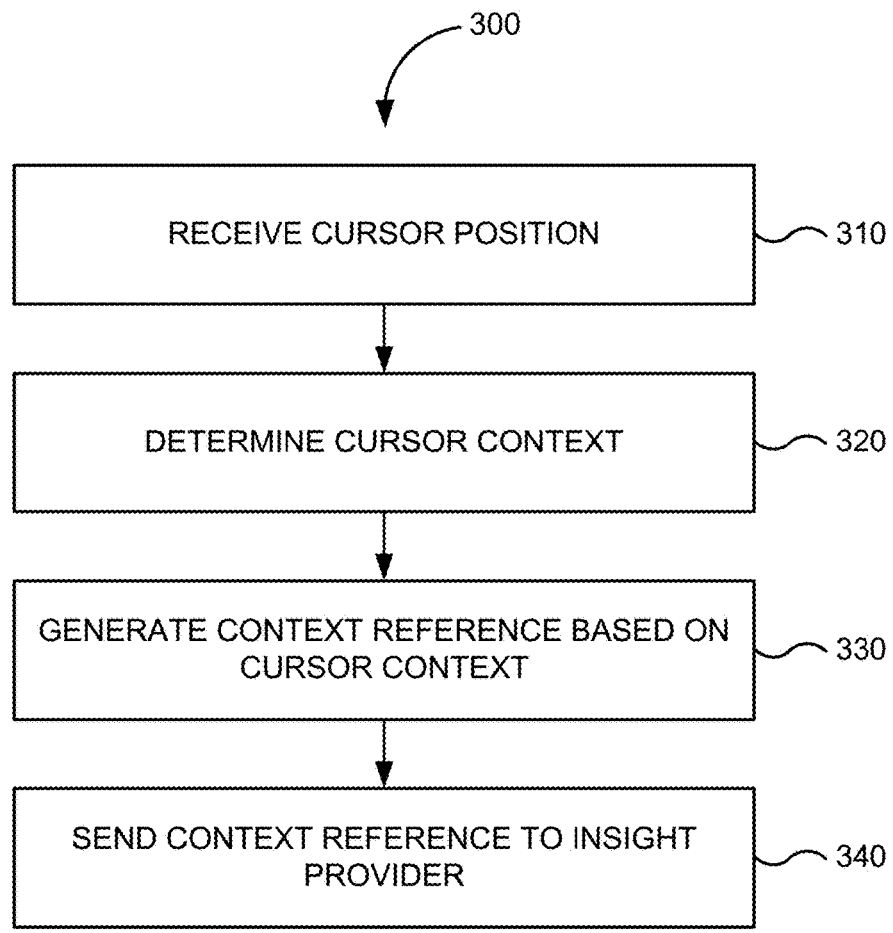
FIG. 3 is a simplified flowchart of a method for generating a context reference in one embodiment.

FIG. 3 is a simplified flowchart of method 300 for generating a context reference in one embodiment. Implementations of or processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 300 depicted in FIG. 3 begins in step 310.

In step 310, a cursor position is received. In step 320, a cursor context associated with the current cursor position is determined. The cursor position may be inside a source language file like CSS, JavaScript, or java. The cursor position can contain or otherwise be associated with information about parent constructs before this position. The file type itself could be a sub type of another file type. For example, SCSS is a subtype of CSS. For simplicity, this is called the "cursor context."

For example, a determination can be made that a user's cursor is placed at a location within a function of a class object defined using Java. The context can include the file name, file type, sub-file type, cursor location, name and other information about an enclosing block of code, name and other information about an enclosing function, method, or procedure, name or other information about a containing class, object, or other programming paradigm, etc. In another example, a determination can be made that a user's cursor is placed at a location within a rule defined using cascading style sheets (CSS). The context can include the file name, file type, sub-file type, cursor location, name and other information about an enclosing rule, name and other information about an enclosing grouping, CSS ordering information, etc.

In step 330, a context reference is generated based on the current cursor context. A context reference as used herein is a string or expression that stores language type and hierarchy information at the current position in a mime type or mime type-like syntax. Expressing a cursor context and language in a single mime type/mime type-like text syntax allows editor assist tools associated with an editor (e.g., editor 215) to easily get and understand the current cursor context.

One purpose of context reference is to describe the context of any data contained at the current cursor position fully enough that an insight provider can process or otherwise deal with the context in an appropriate manner. A context reference can provide specify the nature of the context at the cursor position, by giving type and subtype identifiers, and by providing auxiliary information that may be required for certain types. In certain embodiments, after the type and subtype names, the remainder of a context reference can include a set of parameters, specified in an attribute/value notation. Different types can have a different set of parameters. In some aspects, the ordering of parameters is not significant.

In general, the top-level position of a context reference is used to declare the general type of data, while the subtype specifies a specific format for that type of data. Thus, a context reference of "text/html" is enough to tell an insight provider that the data at the current cursor position is textual data, even if the insight provider has no knowledge of the specific structure of the hyper-text markup language. Parameters can be modifiers of the content-subtype.

RFC 1341 accessible at www.w3.org/Protocols/rfc1341/4_Content-Type.html provides a content-type specification that may be used to create a context reference as discussed herein. In certain embodiments, syntax of a context reference can have a mime type like structure that follows:

Content Reference:=type "/" subtype*[";" parameter]
type:="application"/"audio"/"image"/"message"/"multipart"/"text"/"video"/x-token
x-token:=<The two characters "X-" followed, with no intervening white space, by any token>
subtype:=token
parameter:=attribute "=" value
attribute:=token
value:=token/quoted-string
token:=1*<any CHAR except SPACE, CTLs, or tspecials>

In step 340, the context reference is sent to an insight provider. An insight provider as used herein refers to an application, application component, service, or the like that provides insight into a context. An insight provider may provide syntax formatting, highlighting, navigational aids, hints, code expansion, element definitions, usage patterns, or the like. In certain embodiments, different editor assist handler modules can be chained for a particular feature like insight. The actual handler modules used depends on the cursor context as specified by a context reference. This allows different modules to look at different parts of a cursor context without understanding what the other parts mean. For example, the module that processes a CSS property value need not know about the rules above. The module can just pick its relevant section in the context reference and work with it. Debugging and profiling are easier if parts of a code assist feature can be turned off (because they are independent modules). Allows graceful degradation, for example, if SCSS support is not available, the next lower language, CSS could be used. In case one language allows embedding inside another, this could be used to delegate functionality. For example, html can have embedded CSS or JavaScript.

Figure 4:
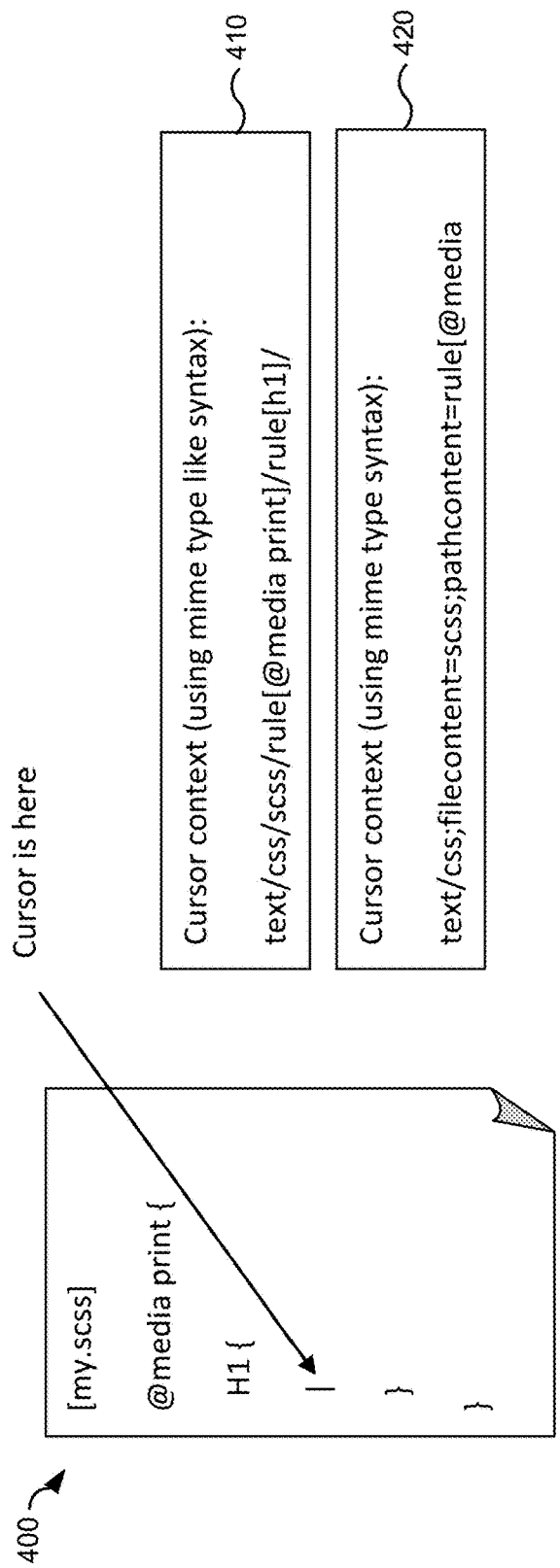
FIG. 4 is an example of a context reference according to one embodiment using SCSS.

FIG. 4 is an example of a context reference according to one embodiment using SCSS. In this example, the cursor is inside a selector in CSS file 400. The CSS language structure can be expressed as a tree. The paths of the tree become parts of the mime path structure. In this case, the cursor is inside a print media specific selector, H1. In one example, the context reference for the current cursor position can be path 410 expressed as "text/css/scss/rule[@media print]/rule[h1]/". As discussed above, if there is no module handler to handle "rule[@media print]", the "rule[h1]" module handler can still do what it can do an so forth. In another example, the context reference for the current cursor position can be expressed as parameter set 420.

FIG. 5 is an example of a context reference according to one embodiment using Dart. This example shows one language in file 500 that has a syntax similar to another language. Dart has a java-like syntax. In one example, the context reference for the current cursor position can be path 510 expressed in the first part as "text/java/dart." After this, the language structure tree paths can be used as the mime path parts. If "dart" is not understood as a language, then java specific adapters can kick in because "text/java" appears before "dart." In another example, the context reference for the current cursor position can be expressed as parameter set 520 with the language structure tree paths added.

Figure 6:
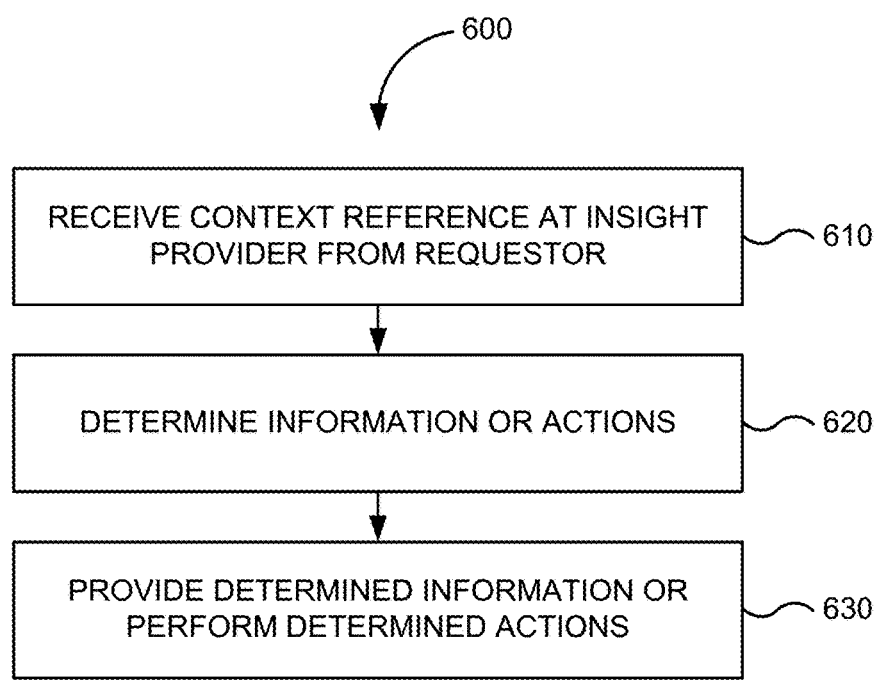
FIG. 6 simplified flowchart of a method for providing insight based on a context reference in one embodiment.

FIG. 6 simplified flowchart of method 600 for providing insight based on a context reference in one embodiment. Implementations of or processing in method 600 depicted in FIG. 6 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 600 depicted in FIG. 6 begins in step 610.

In step 610, a context reference is received at an insight provider. In step 620, information or actions are determined based on context reference. In certain embodiments, the insight provider parses the content reference to determine whether a portion of an expressed path or one or more expressed parameters are handed by the insight provider. If a portion of an expressed path or one or more expressed parameters are handed by the insight provider, the insight provider invokes its designated function. The insight provider can retrieve, generate, or otherwise organization information to be return to a calling application based on the context reference. The insight provider can determine one or more action to be invoked or performed based on the context reference. In step 630, the determined information is provided to the calling application or the one or more determined actions are performed.

Conclusion

Figure 7:
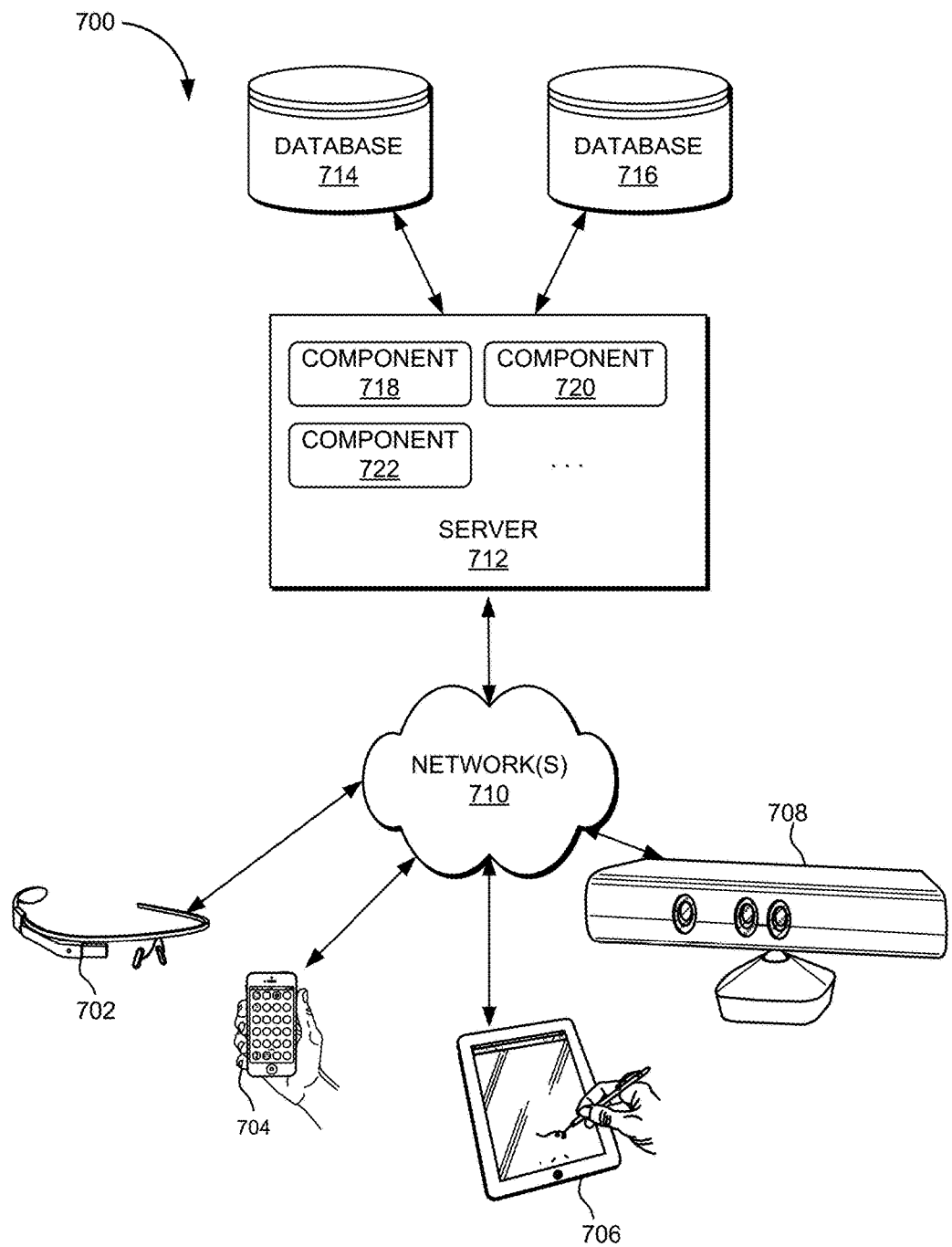
FIG. 7 depicts a simplified diagram of a distributed system for implementing one of the embodiments.

FIG. 7 depicts a simplified diagram of distributed system 700 for implementing one of the embodiments. In the illustrated embodiment, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network 710.

In various embodiments, server 712 may be adapted to run one or more services or software applications provided by one or more of the components of the system. In some embodiments, these services may be offered as web-based or cloud services or under a Software as a Service (SaaS) model or a Platform as a Serves (PaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, software components 718, 720, and 722 of system 700 are shown as being implemented on server 712. In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in the figure is thus one example of a distributed system for implementing an embodiment system and is not intended to be limiting.

Client computing devices 702, 704, 706, and/or 708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. Client computing devices 702, 704, 706, and/or 708 can be general purpose personal computers including, by way of example, personal computers and/or laptop computers running various versions of Microsoft Windows®, Apple Macintosh®, and/or Linux operating systems. Client computing devices 702, 704, 706, and/or 708 can be workstation computers running any of a variety of commercially-available UNIX® or UNIX-like operating systems, including without limitation the variety of GNU/Linux operating systems, such as for example, Google Chrome OS. Alternatively, or in addition, client computing devices 702, 704, 706, and 708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although exemplary distributed system 700 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), such as one based on Ethernet, Token-Ring and/or the like. Network(s) 710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 712 may be composed of one or more general purpose computers, specialized server computers (including, by way of example, PC (personal computer) servers, UNIXO servers, mid-range servers, mainframe computers, rack-mounted servers, etc.), server farms, server clusters, or any other appropriate arrangement and/or combination. In various embodiments, server 712 may be adapted to run one or more services or software applications described in the foregoing disclosure. For example, server 712 may correspond to a server for performing processing described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle, that are adapted to store, update, and retrieve data in response to SQL-formatted commands.

Figure 8:
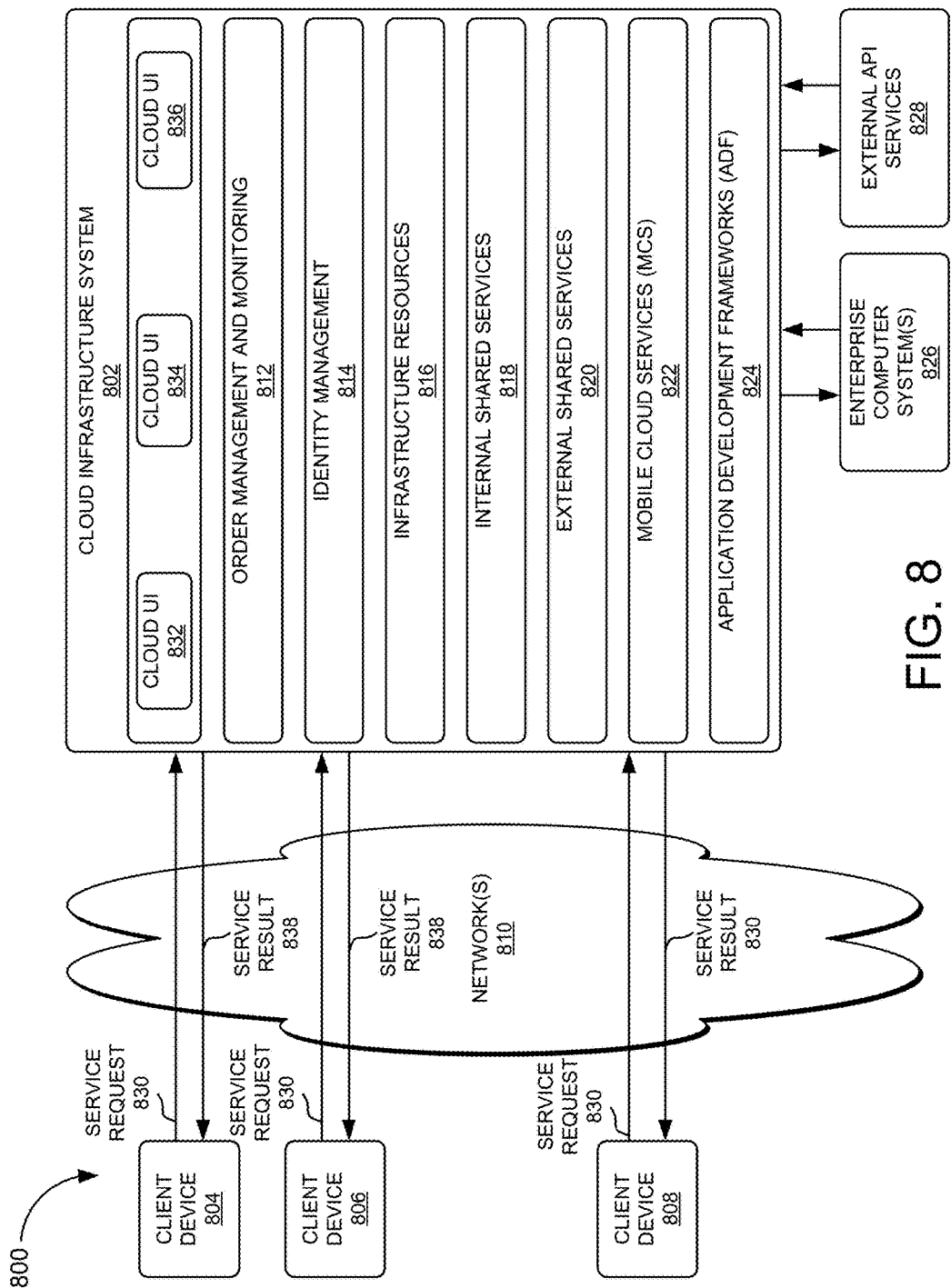
FIG. 8 is a simplified block diagram of components of a system environment by which services provided by the components of an embodiment system may be offered as mobile cloud services, in accordance with an embodiment of the present disclosure.

FIG. 8 is a simplified block diagram of one or more components of system environment 800 by which services provided by one or more components of an embodiment system may be offered as cloud services, in accordance with an embodiment of the present disclosure. In the illustrated embodiment, system environment 800 includes cloud infrastructure system 802 that provides cloud services to one or more client computing devices 804, 806, and 808. Client computing devices 804, 806, and 808 may be used by users to interact with cloud infrastructure system 802. Client computing devices 804, 806, and 808 may be configured to operate a client application such as a web browser, a proprietary client application (e.g., Oracle Forms), or some other application, which may be used by a user of the client computing device to interact with cloud infrastructure system 802 to use services provided by cloud infrastructure system 802.

It should be appreciated that cloud infrastructure system 802 depicted in FIG. 8 may have other components than those depicted. Further, the embodiment shown in FIG. 8 is only one example of a cloud infrastructure system that may incorporate an embodiment of the invention. In some other embodiments, cloud infrastructure system 802 may have more or fewer components than shown in FIG. 8, may combine two or more components, or may have a different configuration or arrangement of components.

Client computing devices 804, 806, and 808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. Client computing devices 804, 806, and 808 can be general purpose personal computers including, by way of example, personal computers and/or laptop computers running various versions of Microsoft Windows®, Apple Macintosh®, and/or Linux operating systems. Client computing devices 804, 806, and 808 can be workstation computers running any of a variety of commercially-available UNIX® or UNIX-like operating systems, including without limitation the variety of GNU/Linux operating systems, such as for example, Google Chrome OS. Alternatively, or in addition, Client computing devices 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Network(s) 810 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Cloud infrastructure system 802 may comprise one or more computers and/or servers. These computer systems or servers may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, one or more computer systems or servers associated with cloud infrastructure system 802 may be adapted to run one or more services or software applications described in the foregoing disclosure. For example, one or more computer systems or servers associated with cloud infrastructure system 802 may correspond to a server for performing processing described herein according to an embodiment of the present disclosure.

One or more computer systems or servers associated with cloud infrastructure system 802 may run an operating system including any of those discussed above, as well as any commercially available server operating system. One or more computer systems or servers associated with cloud infrastructure system 802 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In certain embodiments, services provided by cloud infrastructure system 802 may include a host of services that are made available to users of cloud infrastructure system 802 on demand, such as online data storage and backup solutions, Web-based e-mail services, hosted office suites and document collaboration services, database processing, managed technical support services, and the like. Services provided by cloud infrastructure system 802 can dynamically scale to meet the needs of its users. A specific instantiation of a service provided by cloud infrastructure system 802 is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service instance instantiated by cloud infrastructure 802 may include protected computer network access to storage, a hosted database, a hosted web server, a software application, or other service provided by a cloud vendor to a user, or as otherwise known in the art. For example, a service instance instantiated by cloud infrastructure 802 can include password-protected access to remote storage on the cloud through the Internet. As another example, a service instance instantiated by cloud infrastructure 802 can include a web service-based hosted relational database and a script-language middleware engine for private use by a networked developer. As another example, a service instance instantiated by cloud infrastructure 802 can include access to an email software application hosted on a cloud vendor's web site.

In certain embodiments, cloud infrastructure system 802 may include a suite of applications, middleware, development service, and database service offerings that are delivered to a customer in a self-service, subscription-based, elastically scalable, reliable, highly available, and secure manner. An example of such a cloud infrastructure system as embodied in cloud infrastructure service 802 is the Oracle Public Cloud provided by the present assignee.

Cloud infrastructure system 802 may provide the cloud services via different deployment models. For example, services may be provided under a public cloud model in which cloud infrastructure system 802 is owned by an organization selling cloud services (e.g., owned by Oracle) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. In some embodiments, the services provided by cloud infrastructure system 802 may include, without limitation, application services, platform services and infrastructure services. In some examples, application services may be provided by cloud infrastructure system 802 via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 802 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 802 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by cloud infrastructure system 802 and also control the deployed services. In some embodiments, platform services provided by cloud infrastructure system 802 may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in cloud infrastructure system 802. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like. In various embodiments, cloud infrastructure system 802 may be adapted to automatically provision, manage and track a customer's subscription to services offered by cloud infrastructure system 802. A customer, via a subscription order, may order one or more services provided by cloud infrastructure system 802. Cloud infrastructure system 802 then performs processing to provide the services in the customer's subscription order.

In one embodiment, as depicted in FIG. 8, cloud management functionality may be provided by one or more modules, such as order management and monitoring module 814. These modules may include or be provided using one or more computers and/or servers, which may be general purpose computers, specialized server computers, server farms, server clusters, or any other appropriate arrangement and/or combination.

In exemplary operation, a customer using a client device, such as one or more of client computing devices 804, 806 or 808, may interact with cloud infrastructure system 802 by requesting one or more services provided by cloud infrastructure system 802. The customer may issue service request 834 cloud infrastructure system 802 using a variety of means. Service request 834 may include placing an order for a subscription for one or more services offered by cloud infrastructure system 802, accessing one or more services offered by cloud infrastructure system 802, or the like. In certain embodiments, the customer may access a cloud User Interface (UI), cloud UI 832, cloud UI 834 and/or cloud UI 838 and place a subscription order via these UIs. The order information received by cloud infrastructure system 802 in response to the customer placing an order may include information identifying the customer and information identifying one or more services offered by the cloud infrastructure system 802 to which the customer intends to subscribe. After an order has been placed by the customer, the order information is received via the cloud UIs, 832, 834 and/or 838.

In this example, order management and monitoring module 814 sends information received from a customer to an order database to have the order placed by the customer stored in recorded. The order database can be one of several databases operated by cloud infrastructure system 802 and operated in conjunction with other system elements. Order management and monitoring module 814 may forward information that includes all or part of the order information stored in the order database to an order management module. In some instances, the order management module may be configured to perform billing and accounting functions related to the order, such as verifying the order, and upon verification, booking the order.

Order management and monitoring module 814 may communicate all or part of the order information to an order orchestration module that utilizes the order information to orchestrate the provisioning of services and resources for the order placed by the customer. In some instances, the order orchestration module may orchestrate the provisioning of resources to support the subscribed services using the services of an order provisioning module.

In certain embodiments, the order orchestration module enables the management of business processes associated with each order and applies business logic to determine whether an order should proceed to provisioning. Upon receiving an order for a new subscription, the order orchestration module sends a request to the order provisioning module to allocate resources and configure those resources needed to fulfill the subscription order. The order provisioning module enables the allocation of resources for the services ordered by the customer. The order provisioning module provides a level of abstraction between the cloud services provided by cloud infrastructure system 802 and the physical implementation layer that is used to provision the resources for providing the requested services. The order orchestration module may thus be isolated from implementation details, such as whether or not services and resources are actually provisioned on the fly or pre-provisioned and only allocated/assigned upon request.

In certain embodiments, order management and monitoring module 814 manages and tracks a customer's subscription order. In some instances, order management and monitoring module 814 may receive information indicative of any provisioned services and/or resources associated with the customer. Order management and monitoring module 814 may be configured to collect usage statistics for the services in the subscription order, such as the amount of storage used, the amount data transferred, the number of users, and the amount of system up time and system down time.

Once services and resources are provisioned in the above example, service result 838 may be sent to customers on client computing devices 804, 806, and/or 808 informing the customer of the provided services and/or resources. In instances where service request 830 includes a request to access a service or have a service perform one or more operations, service result 838 may be send to customers on client computing devices 804, 806, and/or 808 providing the requested access or results of any operations, services performed, or data requested.

In certain embodiments, cloud infrastructure system 800 may include identity management module 814. Identity management module 814 may be configured to provide identity services, such as access management and authorization services in cloud infrastructure system 802. In some embodiments, identity management module 814 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.)

Identity management module 814 may also include the management of descriptive information about each customer and about how and by whom that descriptive information can be accessed and modified.

In certain embodiments, cloud infrastructure system 802 may also include infrastructure resources 816 for providing the resources used to provide various services to customers of cloud infrastructure system 802. In one embodiment, infrastructure resources 816 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 818 may be provided that are shared by different components or modules of cloud infrastructure system 802 and by the services provided by cloud infrastructure system 802. These internal shared services 818 may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, a number of external shared services 820 may be provided that are shared by different components or modules of cloud infrastructure system 802 and by the services provided by cloud infrastructure system 802. These external shared services 820 may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In various embodiments, external shared services 820 may include one or more components that provide access, data transformation, automation, or the like to enterprise computer system(s) 826. Access to enterprise computer system(s) 826 may be shared by different components or modules of cloud infrastructure system 802 and by the services provided by cloud infrastructure system 802. In some embodiments, access to enterprise computer system(s) 826 may be shared by service instances provided by cloud infrastructure system 802 that are restricted to one or more subscribers.

In further embodiments, external shared services 820 may include external application programming interface (API) services 828 that are shared by different components or modules of cloud infrastructure system 802 and by the services provided by cloud infrastructure system 802. These external API services 828 may include, without limitation, APIs provided by other third party services or entities.

Various different mobile cloud services may be provided by mobile cloud service (MSC) 822 in cloud infrastructure system 802. MCS 822 facilitates communication between a mobile computing device and enterprise computer systems (e.g., enterprise computer systems 824 and 826) according to some embodiments of the present invention. MCS 822 may include one or more memory storage devices ("local storage") used to store enterprise data and authentication information. Enterprise data may be received from enterprise computer systems 826 or from client computing devices 804, 806, or 808 or may include enterprise data converted by cloud infrastructure system 802, or combinations thereof. Authentication information may be received from identity management system 816 and/or generated by cloud infrastructure system 802. In some embodiments, authentication information may include information indicating security authentication of a user with regard to a request for a service.

Enterprise computer systems, such as enterprise computer systems 826 may be physically located beyond a firewall of cloud infrastructure system 802 at a different geographic location (e.g., remote geographic location) than cloud infrastructure system 802. In some embodiments, enterprise computer systems 826 may include one or more different computers or servers. In some embodiments, enterprise computer systems 826 may be part of a single computer system.

In certain embodiments, enterprise computer systems 826 may communicate with cloud infrastructure system 802 using one or more different protocols. Each of enterprise computer systems 826 may communicate with cloud infrastructure system 802 using a different communication protocols. Enterprise computer systems 826 may support the same or different security protocols. In some embodiments, MSC 8112 may include an agent system to handle communication with enterprise computer systems 826.

A protocol may include a communication protocol, such as SPDY. A protocol may include an application protocol such as an HTTP-based protocol. In some embodiments, enterprise computer systems 826 may communicate with cloud infrastructure system 802 using a REST or SOAP communication protocols. For example, REST protocol may support a formats including URI or URL. Enterprise Data formatted for communication using REST protocol may be easily converted to data formats such as JSON, comma-separated values (CSV), and really simple syndication (RSS). Enterprise computer systems 826 and cloud infrastructure system 802 may communicate using other protocols such as remote procedure calls (RPC) (e.g., XML RPC).

In some embodiments, MCS 822 may include an adaptor interface configured to support communication with one or more services provided by cloud infrastructure service 802, some of which may support different protocols or techniques for communications. In some embodiments, MCS 822 may include an adaptor interface configured to support communication with enterprise computer systems 826, some of which may support different protocols or techniques for communications. MCS 822 may include one or more adaptors each of which may be configured to communicate according to a communication protocol, a type of enterprise computer system, a type of application, a type of service, or combinations thereof. A communication protocol supported by an adaptor may be specific to a service or one or more of enterprise computer systems 826.

In certain embodiments, client computing devices 804, 806, and 808 may each implement an application that can provide specific user interfaces to communicate with MCS 822. A specific UI may be configured to communicate using a specific communication protocol. In some embodiments, specific UIs may include callable interfaces, functions, routines, methods, and/or operations that may be invoked to communicate with MCS 822. Specific UIs may accept as input parameters for communicating with a service provided by cloud infrastructure service 802 or with enterprise computer systems 826 for enterprise data and/or to request a service. In some embodiments, communication through MCS 822 may be converted for communication using a custom communication protocol. In some embodiments, specific UIs may correspond to a custom client in an application.

MCS 822 may include one or more callable interfaces, e.g., an application programming interface (API). Callable interfaces associated with MCS 822 may enable an app on a mobile computing device to communicate requests to MCS 822. Callable interfaces associated with MCS 822 may support a common or standard interface, which may allow requests including their parameters to be received from apps according to a standardized protocol, architectural style, and/or format (e.g., a REST protocol). Callable interfaces associated with MCS 822 may be configurable by a user of any one of computing devices 804, 806, or 808. Callable interfaces associated with MCS 822 may receive requests for services according to a communication protocol. Device application developers can connect to MCS 822 for their custom applications. In some embodiments, a callable interface associated with MCS 822 may be configured by the same person that develops an app, such that the person can implement a custom app to communicate with MCS 822.

Callable interfaces associated with MCS 822 may further enable enterprise computer systems 826 to communicate with MCS 822 according to a standardized protocol or format. Similar to application developers, those who manage enterprise computer systems can implement code (e.g., an agent system) that is configured to communicate with MCS 822 via one or more callable interfaces. Callable interfaces associated with MCS 822 may be implemented based on a type of a computing device, a type of enterprise computer systems, an app, an agent system, a service, a protocol, or other criterion. In some embodiments, callable interfaces associated with MCS 822 may support requests for services including authentication, compression, encryption, pagination with cursors, client-based throttling, non-repudiation, logging, and metrics collection. In some embodiments, callable interfaces associated with MCS 822 may be implemented for custom business-related services, such as authentication, policy enforcement, caching of responses, throttling of calls to MCS 822, translation between asynchronous and synchronous patterns, logging of calls to underlying services, or combinations thereof. In some embodiments, callable interfaces associated with MCS 822 may enable users to load custom code for implementation by cloud infrastructure system 802. The custom code may implement one or more callable interfaces associated with MCS 822 for cloud infrastructure system 802, which can enable users to access custom services or other enterprise computer systems.

Protocol translators associated with MCS 822 may process a message to determine a communication protocol for a message and/or to convert a message to a communication protocol for a destination. Protocol translators associated with MCS 822 may convert a request received from client computing devices 804, 806, or 808. The request may be converted from a format of a communication protocol supported by client computing devices 804, 806, or 808 to a format of a communication protocol supported by a service provided by cloud infrastructure service 802 or enterprise computer systems 826. Protocol translators associated with MCS 822 may convert a response received from a service provided by cloud infrastructure service 802 or enterprise computer systems 826. A response may be converted from a format of a communication protocol supported by a service provided by cloud infrastructure service 802 or enterprise computer systems 826 to a format of a communication protocol supported by client computing devices 804, 806, or 808.

Security services associated with MCS 822 may manage security authentication for requests received from any of client computing devices 804, 806, or 808. Security services associated with MCS 822 may protect the integrity of customer processes and enterprise data. To prevent system or data from being compromised, security authentication may occur when a request is received from client computing devices 804, 806, or 808. Security authentication may be performed before a request is dispatched for processing by cloud infrastructure system 802. The security authentication determined for a user may enable a user associated with a mobile computing device to have authorization to request services via MCS 822. The security authentication may reduce efforts for a user to authenticate for different requests and/or services requested via MCS 822. Security services associated with MCS 822 may be implemented as one or more functional blocks or modules configured to perform various operations authenticating security of a request.

Authentication services associated with MCS 822 may manage security authentication for requests received from client computing devices 804, 806, or 808. Authentication services associated with MCS 822 may determine security authentication for a user associated with a computing device that sends a request to MCS 822. Security authentication may be determined based on a time period, which may be tied to operation of an app (e.g., launching an app), a request, a computing device, an enterprise computer system, other criterion related to a request, or combinations thereof. Security authentication may be verified and granted for any one of the following, such as an individual request, one or more enterprise computer systems, a particular service, a type of service, a user, a computing device, other criterion for determining security authentication, or combinations thereof. In some embodiments, cloud infrastructure system 802 may store authentication information of users received from enterprise computer systems or authentication systems supporting enterprise computer systems. Cloud infrastructure system 802 may determine authentication by performing a lookup function to determine whether an identity of a user associated with a request has authority to make such a request. The stored authentication information may include information such as the type of requests, functions, enterprise computer systems, enterprise data, or the like that a user may be authorized to access. In some embodiments, infrastructure system 802 may initiate communication with a requesting computing device to determine authentication.

In some embodiments, security authentication may be determined based on a role associated with a user requesting a service. The role may be associated with a user requesting access to MCS 822. In some embodiments, a user may request services as a subscriber or tenant of MCS 822 who may be granted access to resources and/or services provided by MCS 822. Authentication may correspond to a user's subscription to MCS 822, such that a user may be authorized to request services via MCS 822 as a subscriber. In some embodiments, the subscription may be limited to a particular set of resources provided by MCS 822. Security authentication may be based on the resources and/or services accessible to the user of MCS 822. In some embodiments, a request may be provisioned a template during execution called a "runtime environment." The runtime environment may be associated with resources that are allocated for a request, a user, or a device.

In some embodiments, authentication services associated with MCS 822 may request an identity management system to determine security authentication for the user. The identity management system may be implemented by cloud infrastructure system 802 (e.g., as identity management 814) or by another computer system that is external to cloud infrastructure system 802. Identity management 816 may determine security authentication of the user based on the user's role or subscription for accessing MCS 822. The role or subscription may be assigned privileges and/or entitlements with respect to an enterprise computer system, a service provided by an enterprise computer system, a function or feature of an enterprise computer system, other criterion for controlling access to an enterprise computer system, or combinations thereof.

Various different application development frameworks (ADFs) may be provided by application development frameworks (ADFs) 824 in cloud infrastructure system 802. ADFs 824 provide the infrastructure code to implement agile SOA based applications. ADFs 824 further provide a visual and declarative approach to development through one or more development tools (e.g., Oracle JDeveloper 11g development tool). One or more frameworks provided by ADFs 824 may implement a Model-View-Controller design pattern. Such frameworks offer an integrated solution that covers all the layers of the MVC architecture with solutions to such areas as Object/Relational mapping, data persistence, reusable controller layer, rich Web user interface framework, data binding to UI, security and customization. Extending beyond the core Web based MVC approach, such frameworks also integrate with the Oracle SOA and WebCenter Portal frameworks simplifying the creation of complete composite applications.

In certain embodiments, ADFs 824 make it easy to develop agile applications that expose data as services by coupling a service interface to built-in business services provided by cloud infrastructure system 802. This separation of business service implementation details is performed in ADFs 824 via metadata. Use of this metadata-driven architecture enables application developers to focus on the business logic and user experience, rather than the details of how services are accessed. In certain embodiments, ADFs 824 store implementation details of services in metadata in a model layer. This enables developers to exchange services without modifying the user interface, making the application extremely agile. Additionally, the developer creating the user interface does not need to bother with business service access details. Instead, developers can focus on developing the application interface and interaction logic. Creating the user experience can be as simple as dragging-and-dropping the desired business services onto a visual page designer and indicating what type of component should represent that data.

In various embodiment, developers interact with ADFs 824 to create modules forming enterprise applications. The enterprise applications can be executed within the context of cloud infrastructure system 802. In various embodiment, developers interact with ADFs 824 to create modules forming mobile applications. The mobile applications can be executed within the context of cloud infrastructure system 802. Features of the present invention described below may be implemented using any desired combination of programming language and application development framework as will be apparent to one skilled in the relevant arts by reading the disclosure provided herein.

One or more frameworks provided by ADFs 824 may be embodied as Oracle ADF in one example. Accordingly, a framework in ADFs 824 can be based on a Model-View-Controller (MVC) design pattern. An MVC application is separated into: 1) a model layer that handles interaction with data-sources and runs the business logic, 2) a view layer that handles the application user interface, and 3) a controller that manages the application flow and acts as the interface between the Model and the View layers. Separating applications into these three layers simplifies maintenance and reuse of components across applications. The independence of each layer from the others results in a loosely coupled, Service Oriented Architecture (SOA).

In various embodiments, ADFs 824 provide tools and resources allowing developers to create an application in the form of multiple layers, each layer containing code modules/files implementing desired logic according to pre-defined specification. Thus, in one embodiment, ADFS 824 enables the application to be developed as four layers: a view layer containing code modules/files that provide the user interface of the application, a controller layer containing code modules that control the flow of the application, a model layer containing data/code modules that provide an abstraction layer for the underlying data, and a business services layer containing code modules that provide access to data from various sources and handles business logic.

In certain embodiments, ADFs 824 let developers choose the technology they prefer to use when implementing each of the layers. EJB, Web Services, JavaBeans, JPA/EclipseLink/TopLink objects, and many others can all be used as Business Services for ADFs 824. View layers can include Web based interfaces implemented with JSF, Desktop Swing applications and MS Office front ends, as well as interfaces for mobile devices.

In one aspect, the view layer represents the user interface of the application being developed. The view layer can include desktop, mobile, and browser-based views, each of which provides all or a portion of the user interface and is accessible in a variety of manners corresponding to view type. For example, web pages may be sent by the application in response to receiving client requests containing corresponding URLs. The web pages may then be displayed by a browser on a display unit (not shown) associated with a requesting client system, thereby enabling users of the requesting client system to interact with the enterprise application. ADFs 824 support multi-channel access to business services allowing reuse of business services and access from a Web client, a client-server swing desktop-based application, Microsoft Excel spreadsheets, mobile devices such as a smart-phone, or the like.

The code files/modules forming the view layer (such as web pages) may be implemented using one or more of hypertext markup language (HTML), Java server pages (JSP), and Java Server Faces (JSF). Alternatively, the user interface may be implemented using Java components such as Swing, and/or extensible markup language (XML). As further noted, the user interface may leverage a user's experience and familiarity with desktop applications, such as Word and Excel by Microsoft.

As noted above, the relevant user-developed code/data modules are provided in each of the layers. However, each layer typically contains other pre-defined code/data modules provided by ADFs 824. Some of the pre-defined modules may be used during development, for example, as templates for developing the web pages, for including desired functionality in the developed code etc. Other pre-defined modules (such as a URL rewriting module) may be deployed along with the developed application and may provide additional functionalities (mapping of requested URLs to internal names) to the user during execution of the enterprise application.

A controller layer contains code modules/files that control the flow of the application. Each controller object contains software instructions and/or data implemented according to a desired manner of presenting information in the view layer. The desired manner may include the specific web pages to be displayed when links in another web page are clicked/selected by the user, the page to be displayed when errors occur during execution, indicating the specific data to be stored/retrieved, etc.

In one aspect, the controller layer manages the applications flow and handles user input. For example, when a Search button is clicked on a page, the controller determines what action to perform (do a search) and where to navigate to (the results page). There are two controller options for web-based applications in JDeveloper: the standard JSF controller or the ADF Controller that extends the JSF controller functionality. Whichever controller is used, application flow is typically designed by laying out pages and navigation rules on a diagram. An application's flow can be broken into smaller, reusable task flows; include non-visual components such as method calls and decision points in a flow; and create "page fragment" flows that run inside a region of a single containing page.

The code modules/files forming the controller layer are often implemented as Java servlets receiving the client requests and sending desired web pages as corresponding responses. Controller objects may also be implemented, for example, as Apache Jakarta Struts controllers or according to the JSF standard.

A model layer contains data/code modules that connect various business services to the objects that use them in the other layers, such as to the controller objects discussed above or directly to desktop applications as shown. Each abstract data objects of the model layer provides a corresponding interface that can be used to access any type of business service, executing in an underlying business service layer. The data objects may abstract the business service implementation details of a service from a client and/or expose data control methods/attributes to view components, providing a separation of the view and data layers.

In one aspect, the model layer consists of two components, data controls and data bindings, which utilize metadata files to define the interface. Data controls abstract the business service implementation details from clients. Data bindings expose data control methods and attributes to UI components, providing a clean separation of the view and model. Due to the metadata architecture of the model layer, developers get the same development experience when binding any type of Business Service layer implementation to the View and Controller layers.

In certain embodiments, ADFs 824 emphasizes the use of the declarative programming paradigm throughout the development process to allow users to focus on the logic of application creation without having to get into implementation details. At a high level, the development process for a Fusion web application usually involves creating an application workspace. Using a wizard, libraries and configuration needed for technologies selected by a developer are automatically added and an application is structured into projects with packages and directories.

By modeling database objects, an online database or offline replica of any database can be created, definitions edited, and schemas updated. Using an UML modeler, use cases can then be created for the application. Application control and navigation can also be designed. Diagrammers can be used to visually determine the flow of application control and navigation. Then, an underlying XML file describing the flow can be automatically created. A resource library can be used to allow a developer to view and use imported libraries by simply dragging and dropping them into the application. From database tables, entity objects can be created using wizards or dialogs. From those entity objects, view objects are created to be used by pages in the application. Validation rules and other types of business logic can be implemented.

In this example, a business services layer manages interaction with a data persistence layer. It provides such services as data persistence, object/relational mapping, transaction management, and business logic execution. The business services layer can be implemented in any of the following options: as simple Java classes, EJB, Web services, JPA objects, and Oracle ADF Business Components. In addition, data can be consumed directly from files (XML or CSV) as well as REST. Thus, each business service manages interaction with a corresponding data persistence layer, and also provides such services as object/relational mapping, transaction management, business logic execution, etc. The business services layer may be implemented using one or more of simple Java classes, Enterprise Java Beans, web services, etc.

Business components represent a business service implemented using, for example, Oracle ADF Business Components, to provide interaction with databases, web services, legacy systems, application servers, and the like. In one embodiment, business components of the business services layer contain a mixture of application modules, view/query objects, and entity objects, which cooperate to provide the business service implementation. An application module can be a transactional component/code module that UI clients communicate with for working with application/transaction data. The application module may provide an updatable data model and also procedures/functions (commonly referred to as service methods) related to user transactions.

An entity object may represent a corresponding row in a database table and simplifies the manipulation (update, deletion, etc.) of the data stored in the corresponding row. An entity object often encapsulates business logic for the corresponding row to ensure that the desired business rules are consistently enforced. An entity object may also be associated with other entity objects to reflect relationships existing between rows stored in the underlying database.

Figure 9:
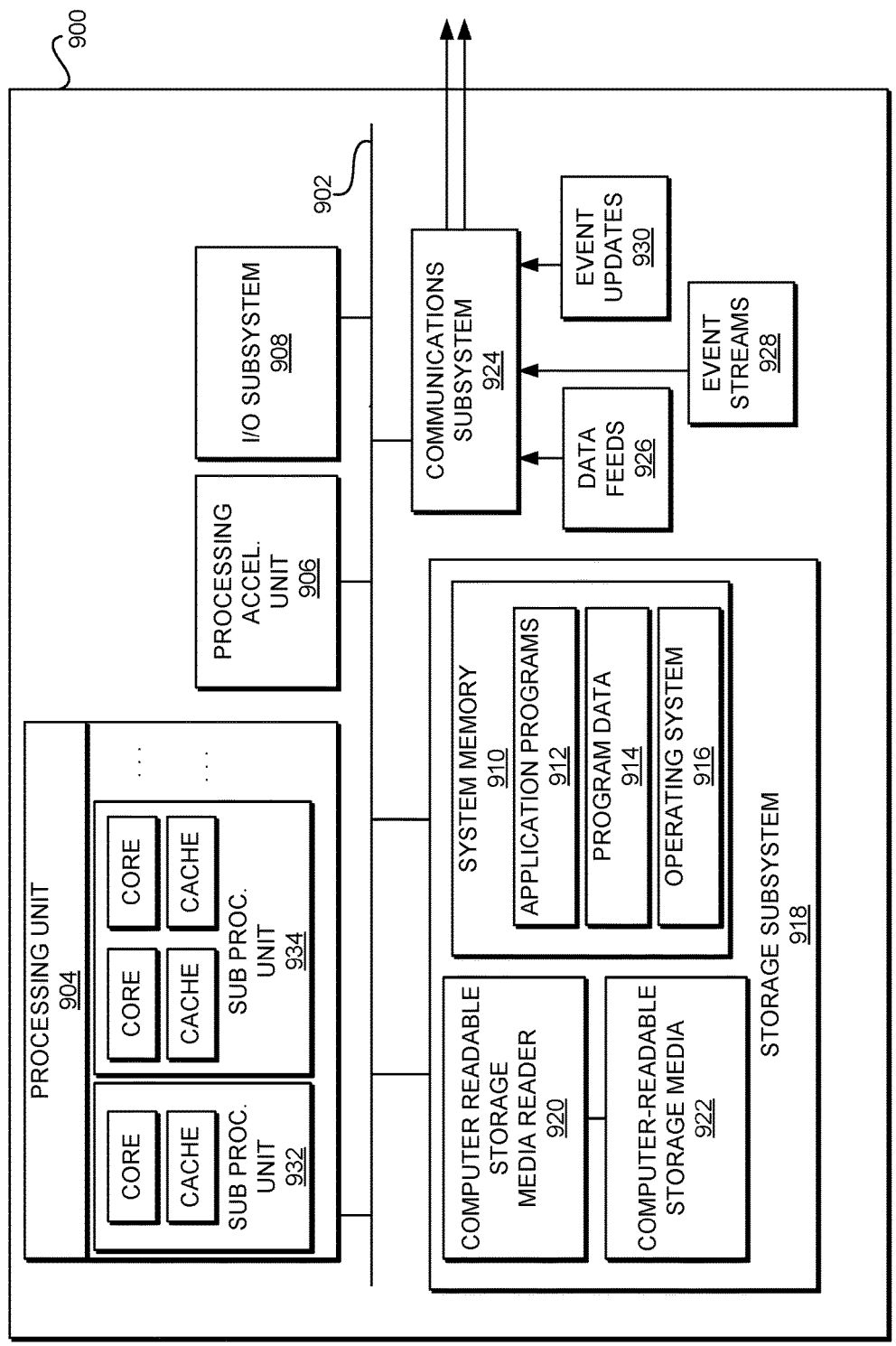
FIG. 9 illustrates an exemplary computer system, in which various embodiments of the present invention may be implemented.

FIG. 9 illustrates an exemplary computer system 900, in which various embodiments of the present invention may be implemented. The system 900 may be used to implement any of the computer systems described above. As shown in FIG. 9, computer system 900 includes bus subsystem 902 and processing unit 904 that communicates with a number of peripheral subsystems via bus subsystem 902. These peripheral subsystems may include processing acceleration unit 906, I/O subsystem 908, storage subsystem 918, and communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present invention.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   receiving, by a processor of a computing system, a document, the document including one or more lines of code written in a programming language;
   detecting, by the processor of the computing system, a position of a cursor in the document;
   determining, by the processor of the computing system, a context of at least one line of code of the one or more lines of code at the position of the cursor in the document, wherein the context comprises at least a document type, a document subtype, and a hierarchy within the document for the at least one line of code of the one or more lines of code, and wherein the hierarchy represents one or more objects within which the at least one line of code of the one or more lines of code is located, the hierarchy including an identifier of a class object;

generating, by the processor of the computing system, a context reference for the position of the cursor in the document using the context of the at least one line of code of the one or more lines of code, the context reference represented as expression that includes at least the document type, the document subtype, and the hierarchy that includes the identifier of the class object;

transferring, by the processor of the computing system, the context reference to an insight provider, wherein the insight provider includes a set of editor assist handler modules;

selecting, by the processor of the computing system and using the context reference, one or more editor assist handler modules from a set of editor assist handler modules, wherein each editor assist handler module of the one or more editor assist handler modules are different;

processing, by the processor of the computing system, the context reference by chaining the one or more editor assist handler modules, wherein each editor assist handler module of the one or more editor assist handler modules processes a different portion of the context reference;

providing, by the processor of the computing system, a feature associated with the position of the cursor in the document based on processing the context reference using the one or more editor assist handler modules, the feature presenting one or more instructions selectable by a user to be added to the at least one line of code of the one or more lines of code, wherein the feature is provided by an application that is configured to render the document.

2. The method of claim 1, wherein the generating the context reference comprises expressing in a media type tree a path in the hierarchy to the at least one line of code of the one or more lines of code.

3. The method of claim 1, wherein the generating the context reference comprises expressing in a media type tree a set of parameters in the hierarchy for the at least one line of code of the one or more lines of code.

4. The method of claim 1, wherein the determining the context of the at least one line of code of the one or more lines of code comprises determining that the cursor is located within a rule defined using style sheets, and
expressing in a media type tree the rule of the style sheet that includes a selector at the position of the cursor.

5. The method of claim 1, wherein the determining the context of the at least one line of code of the one or more lines of code comprises determining a function or method that encloses a block of code at the position of the cursor, and
expressing in a media type tree the function or method that is enclosed in the block of code at the position of the cursor.

6. The method of claim 1, wherein the generating the context reference comprises generating a string having the document type, the document subtype, and the hierarchy expressed as token-separated elements in a media type tree.

7. The method of claim 1, wherein the generating the context reference comprises generating a string having the document type, the document subtype, and the hierarchy expressed as attribute-value pairs in a media type tree.

8. A system comprising:
a hardware processor; and
a memory storing a set of instruction which when executed by the processor cause the processor to:
receive a document including one or more lines of code written in a programming language;
detect a position of a cursor in the document;
determine a context of at least one line of code of the one or more lines of code at the position of the cursor, and wherein the context includes a hierarchy representing one or more objects within which the at least one line of code of the one or more lines of code is located, the hierarchy including an identifier of a class object; and
generate a context reference for a current position of the cursor based on the determined context, wherein the context reference is represented as an expression that includes at least a type and subtype of the document and the hierarchy of the context;
transfer the context reference to an insight provider, wherein the insight provider includes a set of editor assist handler modules;
selecting, using the context reference, one or more editor assist handler modules from a set of editor assist handler modules, wherein each editor assist handler module of the one or more editor assist handler modules are different;
processing the context reference by chaining the one or more editor assist handler modules, wherein each editor assist handler module of the one or more editor assist handler modules processes a different portion of the context reference;
provide a feature associated with the position of the cursor in the document based on processing the context reference using the one or more editor assist handler modules, the feature presenting one or more instructions selectable by a user to be added to the at least one line of code of the one or more lines of code, wherein the feature is provided by an application that is configured to render the document.

9. The system of claim 8, wherein to generate the context reference, the set of instructions further cause the processor to express in a media type tree a path in the hierarchy to the at least one line of code of the one or more lines of code.

10. The system of claim 8, wherein to generate the context reference, the set of instructions further cause the processor to express in a media type tree a set of parameters in the hierarchy for the at least one line of code of the one or more lines of code.

11. The system of claim 8, wherein the determining the context within the document comprises determining that the cursor is located within a rule defined using style sheets, and wherein the set of instructions further cause the processor to express in a media type tree the rule of the style sheets that includes a selector at the position of the cursor.

12. The system of claim 8, wherein the determining the context within the document comprises determining a function or method that encloses a block of code at the position of the cursor, and wherein the set of instructions further cause the processor to express in a media type tree the function or method that is enclosed by the block of code at the position of the cursor.

13. The system of claim 8, wherein to generate the context reference, the set of instructions further cause the processor to generate a string having the type and subtype of the document and the hierarchy expressed as token-separated elements in a media type tree.

14. The system of claim 8, wherein to generate the context reference, the set of instructions further cause the processor to generate a string having the type and subtype of the document and the hierarchy expressed as attribute-value pairs in a media type tree.

15. A non-transitory computer-readable medium storing a computer program product which when executed by one or more processors associated with one or more computer system cause the one or more processors to carry out a method comprising:
  receiving, by an application, a document including one or more lines of code written in a programming language;
  receiving a context reference associated with at least one line of code of the one or more lines of code at a position of a cursor within the document, the context reference comprising a media type tree, and wherein the context reference is an expression represented by a mime-type syntax;
  determining a type and subtype of the document using the context reference in response to parsing the media type tree of the context reference;
  determining a hierarchy within the document in response to parsing the media type tree of the context reference, the hierarchy representing one or more objects within which the at least one line of code of the one or more lines of code is located, the hierarchy including an identifier of a class object;
  generating information based on analyzing one or more elements in the determined hierarchy by:
    selecting, using the context reference, the type and subtype of the document, and the hierarchy, one or more editor assist handler modules from a set of editor assist handler modules, wherein each editor assist handler module of the one or more editor assist handler modules are different; and
    processing the context reference by chaining the one or more editor assist handler modules, wherein each editor assist handler module of the one or more editor assist handler modules processes a different portion of the context reference;
  performing one or more actions using the information that is based on analyzing the one or more elements in the determined hierarchy, wherein an action of the one or more actions includes presenting one or more instructions associated with the at least one line of code of the one or more lines of code, wherein the one or more actions are performed by an application configured to render the document.

16. The non-transitory computer-readable medium of claim 15, wherein the context reference comprises an expression in the media type tree of a path in the hierarchy to the at least one line of code of the one or more lines of code.

17. The non-transitory computer-readable medium of claim 15, wherein the context reference comprises an expression in the media type tree of a set of parameters in the hierarchy for the at least one line of code of the one or more lines of code.

18. The non-transitory computer-readable medium of claim 15, wherein the one or more actions include one or more of: intelligent code completion, intelligent hinting, and intelligent navigation.

\* \* \* \* \*